United States Patent

Kisselmann et al.

[15] 3,639,836
[45] Feb. 1, 1972

[54] MOVING-COIL ASSEMBLY FOR ELECTRICAL MEASURING INSTRUMENTS

[72] Inventors: Willy Kisselmann, Grunwald; Fritz Rumpelein, Munchen; Paul Kopf; Franz Landbrecht, both of Unterhaching, all of Germany

[73] Assignee: AGFA-Gevaert Aktiengesellschaft, Leverkusen, Germany

[22] Filed: June 4, 1969

[21] Appl. No.: 830,328

[30] Foreign Application Priority Data

June 7, 1968 Germany.....................P 17 66 527.9

[52] U.S. Cl. .................................................324/154 R
[51] Int. Cl. .....................................................G01r 1/00
[58] Field of Search ..............324/151, 154, 155; 335/222, 335/148

[56] References Cited

UNITED STATES PATENTS 1,792,385  2/1931  Matthews ..............................324/155

FOREIGN PATENTS OR APPLICATIONS 467,453  2/1969  Switzerland ..........................324/155

Primary Examiner—Alfred E. Smith
Attorney—Michael S. Striker

[57] ABSTRACT

The moving-coil assembly of a moving-coil electrical measuring instrument comprises two coaxial staffs extending into recesses provided in two stationary bearings and mounted on elastic sections of plastic carriers which are secured to the coil-supporting frame. The extent of flexing of the elastic sections is limited by stops provided on the carriers in such a way that the tips of staffs cannot leave their recesses when the sections are flexed in response to shocks and that the sections cannot contact the outermost windings of the coil which is convoluted around the frame.

10 Claims, 2 Drawing Figures

INVENTOR
WILLY KISSELMANN
FRITZ RUMPELEIN
PAUL KOPF
FRANZ LANDBRECHT

BY

MOVING-COIL ASSEMBLY FOR ELECTRICAL MEASURING INSTRUMENTS

BACKGROUND OF THE INVENTION

The present invention relates to electrical measuring instruments, particularly to moving-coil instruments wherein a frame carrying a coil is movable with reference to a stationary part of the instrument whereby a pointer which is mounted on the frame assumes a plurality of positions each of which is indicative of a different voltage or current flowing through the coil. Still more particularly, the invention relates to improvements in moving-coil assemblies of electrical instruments of the type disclosed in our copending application Ser. No. 810,585 which is assigned to the same assignee.

Our aforesaid application Ser. No. 810,585 discloses a coil assembly wherein the frame for the coil supports two elastic plastic carriers each of which is provided with a weakened elastic section supporting an outwardly extending pivot member or staff. The tips of the staffs extend into recesses of coaxial bearings which are mounted in a stationary part of the instrument. The central sections of the carriers are spaced from the adjoining windings of the coil to make sure that the sections can yield inwardly in response to shocks which might arise when the instrument is in use. Since the number of windings, the thickness of wire, the distribution of windings and/or other characteristics of the coil vary in dependency on the intended use of the instrument, the extent to which the central sections of the carriers can flex toward the coil varies from instrument to instrument. It can happen, therefore, that the maximum extent to which the central sections can flex exceeds the depth of recesses which are provided in the aforementioned bearings to receive the tips of the pivot members. Consequently, the pivot members can jump out of such recesses in response to shocks which cause substantial flexing of central portions of the corresponding carriers. This renders the instrument useless so that, for example, a camera or a tape recorder which embodies the instrument must be returned to the factory or sent to a repair shop.

SUMMARY OF THE INVENTION

An object of our invention is to provide an electrical measuring instrument, particularly a moving-coil instrument, wherein the carriers which support the pivot members for the moving-coil assembly are designed in such a way that they prevent the tips of pivot members from leaving the recesses of associated bearings.

Another object of the invention is to provide a moving-coil assembly wherein the flexible parts of carriers for the pivot members cannot damage the windings of the coil.

A further object of the invention is to provide the moving-coil assembly with simple, compact, inexpensive and reliable means for limiting the extent of flexing of elastic portions or sections of carriers for pivot members.

The invention is embodied in an electrical measuring instrument which comprises a pair of spaced coaxial bearings having recesses facing each other, and a novel moving-coil assembly located between the two bearings and including a coil-supporting frame, a pair of preferably plastic carriers movable with the frame about the common axis of the bearings and each adjacent to but spaced from one of the bearings, a pair of pivot members or staffs each supported by one of the carriers and each having a preferably conical end portion or tip extending into the recess of the adjacent bearing so that the entire moving-coil assembly can turn on the tips of the pivot members. At least one of the carriers includes an elastically deformable section which supports the respective pivot member and is movable therewith in a direction away from the adjacent bearing, for example, in response to shocks which, in the absence of such elastically deformable section, could result in serious damage to or total destruction of the instrument. In accordance with a feature of our invention, the moving-coil assembly further comprises means for limiting the extent of movement of the elastic section, preferably in such a way that the tip of the corresponding pivot member cannot leave its recess and that the section cannot abut against and eventually damage the adjoining windings of the coil.

The novel features which are considered as characteristic of the invention are set forth in particular in the appended claims. The improved moving-coil assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
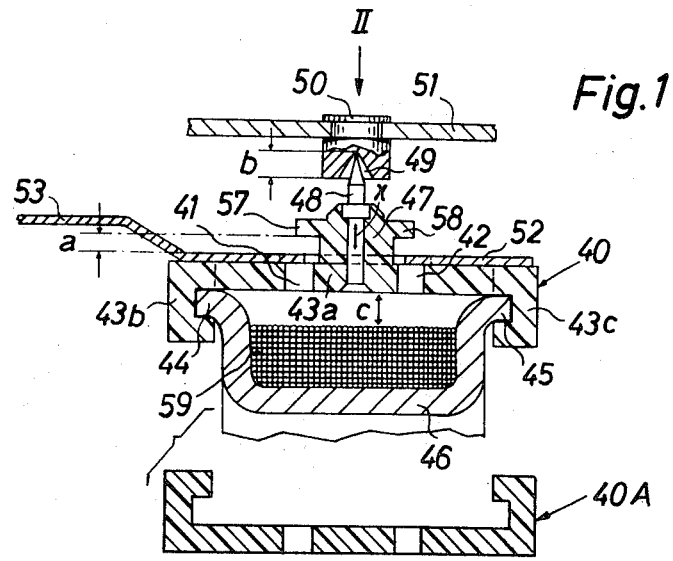
FIG. 1 is an enlarged fragmentary sectional view of a moving-coil assembly which embodies the invention, the section being taken in the direction of arrows as seen from the line I—I of FIG. 2.

FIG. 1 shows an electrical measuring instrument for use in the exposure controls of photographic apparatus, in tape recorders or the like. The moving-coil assembly of the instrument comprises a hollow rectangular frame 46, preferably of the type shown in FIG. 1 of our copending application Ser. No. 810,585. The frame 46 has two pairs of outwardly extending parallel male coupling portions or ribs 44, 45 (only one pair shown) which extend into grooves provided in the marginal female coupling portions 43b, 43c of two elastic plastic carriers 40, 40A. The windings of the coil 59 are convoluted around the external surface of the frame 46 between the ribs 44, 45 so that the outermost windings of the coil are normally separated from the inner sides of the carriers 40, 40A by clearances c. Two U-shaped cutouts or slots 41, 42 of the carrier 40 separate its marginal female coupling portions 43b, 43c from a flexible central portion or section 43a. The carrier 40A is of identical design and will not be further described because all descriptive matter pertaining to the carrier 40 applies for the carrier 40A as well. The slots 41, 42 enhance the flexibility of the thus weakened central section 43a so that the latter's inner side is capable of moving into contact with the outermost windings of the coil 59. The marginal portions 43b, 43c are also flexible; however, they cannot be flexed at will because their grooves receive the relatively stiff ribs 44, 45 of the frame 46. During assembly, the carrier 40 is simply slipped onto the corresponding side of the frame 46 so that the grooves of its marginal portions 43b, 43c receive the ribs 44, 45.

The central section 43a of the carrier 40 is integral with an outwardly extending sleeve 47 which serves as a means for anchoring an outwardly extending pivot member or staff 48 having a pointed outer end portion or tip. When the instrument is properly assembled, the conical tip of the pivot member 48 extends with lateral clearance into a conical recess 49 provided in the inner side of a bearing 50 which is mounted in a bridge 51 secured to the housing of the instrument in a manner not forming part of the present invention.

Figure 2:
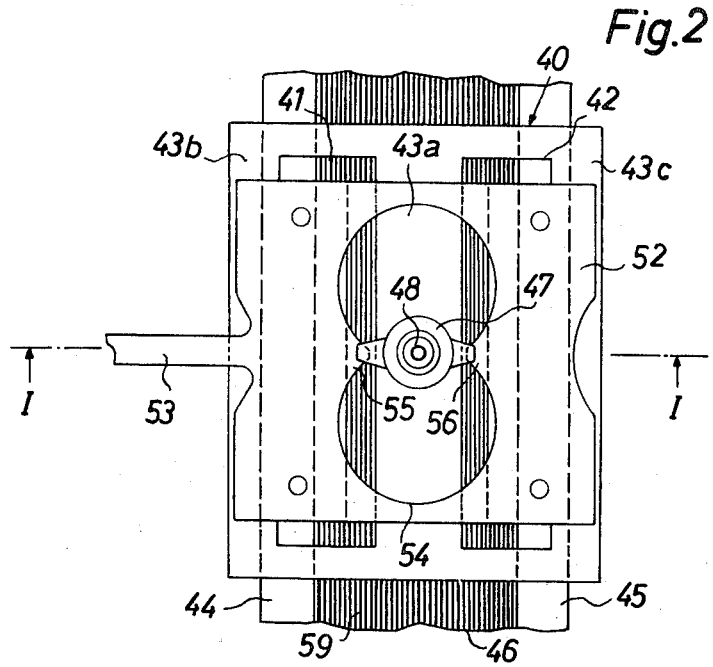
FIG. 2 is a plan view as seen in the direction of arrow II in FIG. 1, with the upper bearing removed.

The outer side of the carrier 40 is connected with a platelike holder 52 which is formed with or connected to a pointer 53. That portion of the holder 52 which overlaps the central section 43a is formed with a relatively large opening 54 (best shown in FIG. 2) which is designed in such a way that it cannot materially interfere with normal flexing of the section 43a. The holder 52 is further provided with two projections or stops 55, 56 which are located opposite each other and flank the median part of the central section 43a. The inner end portions of the projections 55, 56 extend into the path of movement of two projections or abutments 57, 58 which are preferably (but need not be) integral with the sleeve 47, i.e., with the central section 43a. The carrier 40, its sleeve 47 and the abutments 57, 58 can be produced by injection molding. If desired, the abutments 57, 58 can be produced separately and are then welded, glued, riveted or otherwise securely affixed to the sleeve 47. Such separately produced abutments may be made of a suitable metallic material and are inserted into the mold prior to formation of the carrier 40.

In accordance with a feature of our invention, the maximum flexing (distance $a$) to which the central portion 43$a$ of the carrier 40 can be subjected (in the direction indicated by arrow $x$) in response to a sudden shock is less than the depth $b$ of the recess 49 for the conical tip of the pivot member 48. Thus, the distance $a$ corresponds to the distance covered by the abutments 57, 58 during movement toward engagement with the stops 55, 56 of the holder 52. Consequently, the tip of the pivot member 48 cannot leave the recess 49 even if the central section 43$a$ is subjected to a deforming stress which would cause the staff to leave its recess in the absence of abutments 57, 58 and stops 55, 56. The distance $a$ is preferably less than the aforementioned distance or clearance $c$ so that the inner side of the flexible central section 43$a$ cannot contact the outermost windings of the coil 59 when the abutments 57, 58 reach the respective stops 55, 56. This is an important advantage of our instrument because repeated or strong impact of the central section 43$a$ against the coil 59 could cause disturbances, particularly by damaging the insulating lacquer which coats the wires forming the windings of the coil 59.

The second carrier 40A is preferably connected with a second holder, and its flexible central section also carries a sleeve for a second pivot member or staff which extends into a second bearing. The sleeve of the carrier 40A and the holder on the second carrier are preferably provided with projections which correspond to abutments 57, 58 and stops 55, 56. This insures that the tip of the second pivot member cannot leave the recess of the associated bearing.

We prefer, at the present time, to employ carriers whose sleeves are integral with one or two abutments 57 or 58 or 57, 58. This insures that each of a series of successively produced carriers (which are produced in the same mold) behaves in exactly the same way as all other carriers, i.e., that the central section of each carrier can flex to the same extent. It is further clear that the stops 55, 56 need not be provided on the holder 52; they can be provided on another part which does not participate in flexing of the central section 43$a$. For example, the stops 55, 56 or similar stops can be provided directly on the marginal female coupling portions 43$b$, 43$c$ which are stiffened due to the fact that their grooves receive the rigid or substantially rigid ribs 44, 45 of the frame 46. The holder 52 preferably consists of a metallic material and is sufficiently stiff to insure that the stops 55, 56 effectively prevent excessive flexing of the central section 43$a$ toward the adjoining windings of the coil 59. Furthermore, and since the stops 55, 56 are relatively short, they are sufficiently rigid to prevent excessive flexing of the section 43$a$ even if the holder 52 consists of elastically deformable material.

Another important advantage of the instrument is that the abutments 57, 58 and the stops 55, 56 are provided on or otherwise supported by the carrier 40. Therefore, the extent of maximum permissible flexing of the central section 43$a$ is not influenced by eventual inaccuracies in mounting of the carrier on the frame 46 or during assembly of other parts which together form the instrument.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In an instrument of the character indicated, a combination comprising a pair of spaced coaxial bearings having recesses facing each other; and a moving-coil assembly including a coil-supporting frame, a pair of carriers movable with said frame and each adjacent to one of said bearings, a pair of pivot members supported by said carriers and having portions extending into the recesses of the adjacent bearings, at least one of said carriers having a first section connected with said frame and a deformable second section which is fixedly attached to and supports the respective pivot member and is movable with such pivot member with reference to said first section in a direction away from the adjacent bearing, and means for limiting the extent of movement of said second section with reference to said first section.

2. A combination as defined in claim 1, wherein said means for limiting comprises abutment means arranged to share the movements of said second section and stop means provided on said one carrier adjacent to the path of movement of said abutment means.

3. A combination as defined in claim 1, wherein said means for limiting is arranged to confine said second section to a movement whose extent is less than the depth of the recess in the adjoining bearing.

4. A combination as defined in claim 1, wherein the coil supported by said frame includes windings adjacent to but spaced from said second section, said means for limiting being arranged to confine said second section to a movement which is less than the distance between said second section and said windings in undeformed condition of said second section.

5. In an instrument of the character indicated, a combination comprising a pair of spaced coaxial bearings having recesses facing each other; and a moving-coil assembly including a coil-supporting frame, a pair of carriers movable with said frame and each adjacent to one of said bearings, a pair of pivot members supported by said carriers and having portions extending into the recesses of the adjacent bearings, at least one of said carriers having an elastically deformable section which supports the respective pivot member and is movable therewith in a direction away from the adjacent bearing, and means for limiting the extent of such movement of said section, said means for limiting comprising abutment means arranged to share the movements of said section and stop means provided on said one carrier adjacent to the path of movement of said abutment means, said abutment means constituting an integral part of said one carrier.

6. In an instrument of the character indicated, a combination comprising a pair of spaced coaxial bearings having recesses facing each other; and a moving-coil assembly including a coil-supporting frame, a pair of carriers movable with said frame and each adjacent to one of said bearings, a pair of pivot members supported by said carriers and having portions extending into the recesses of the adjacent bearings, at least one of said carriers having an elastically deformable section including a sleeve rigid with the respective pivot member, said section being movable with the respective pivot member in a direction away from the adjacent bearing, and means for limiting the extent of such movement of said section, said means for limiting comprising abutment means arranged to share the movements of said section and stop means provided on said one carrier adjacent to the path of movement of said abutment means, said abutment means comprising at least one abutment provided on said sleeve.

7. A combination as defined in claim 6, wherein said abutment means comprises two abutments located diametrically opposite each other and extending substantially radially outwardly from the axis of said sleeve.

8. In an instrument of the character indicated, a combination comprising a pair of spaced coaxial bearings having recesses facing each other; and a moving-coil assembly including a coil-supporting frame, a pair of carriers movable with said frame and each adjacent to one of said bearings, a pair of pivot members supported by said carriers and having portions extending into the recesses of the adjacent bearings, at least one of said carriers having an elastically deformable section which supports the respective pivot member and is movable therewith in a direction away from the adjacent bearing, means for limiting the extent of such movement of said section, and holder means provided on said one carrier, said means for limiting comprising abutment means movable with said section and stop means provided on said holder means and extending into the path of movement of said abutment means.

9. A combination as defined in claim 8, wherein said holder means comprises a metallic plate.

10. A combination as defined in claim 8, wherein said holder means is provided with an opening in the region of said section, said abutment means comprising a plurality of discrete abutments rigid with said section and said stop means comprising a plurality of discrete stops integral with said holder means, said stops being adjacent to said opening and each thereof extending into the path of movement of one of said abutments.

* * * * *